(No Model.)
P. E. EVERETT.
SELF CLOSING FAUCET.
No. 406,273. Patented July 2, 1889.
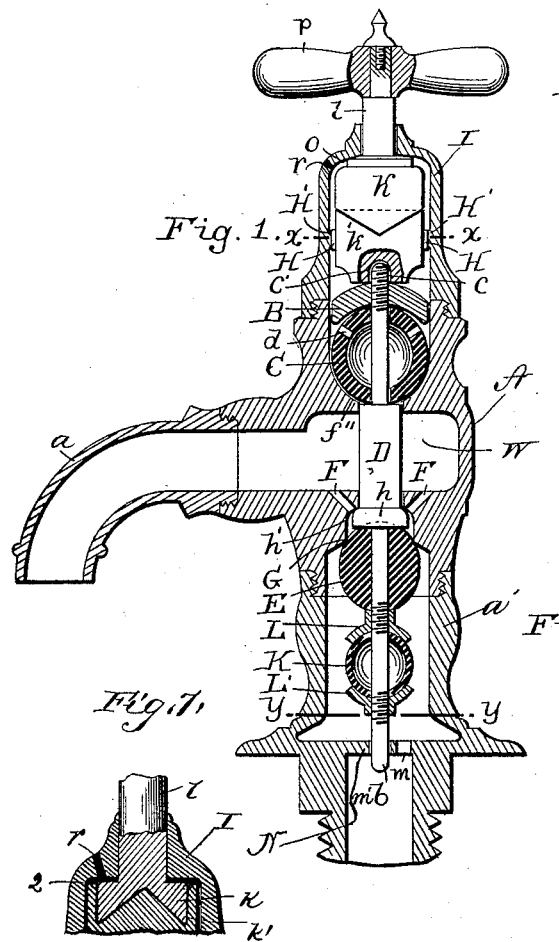
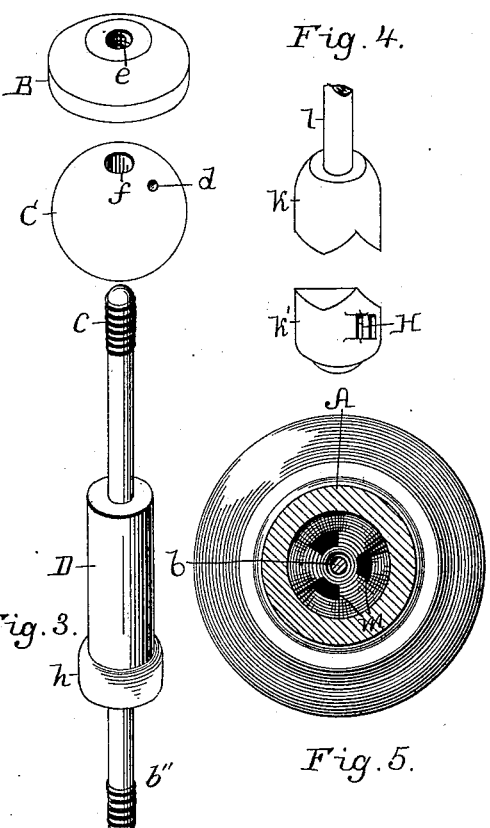
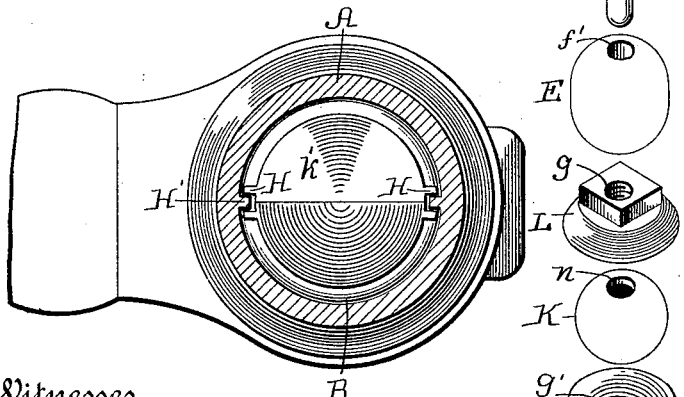
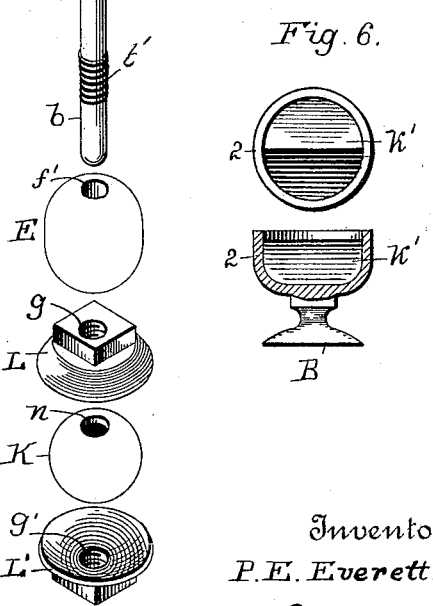
Witnesses
F. G. Fischer
A. A. Higdon
Inventor
P. E. Everett.
By His Attorney
J. C. Higdon
N. PETERS, Photo-Lithographer, Washington, D. C.

UNITED STATES PATENT OFFICE.

PIERCE E. EVERETT, OF KANSAS CITY, MISSOURI.

SELF-CLOSING FAUCET.

SPECIFICATION forming part of Letters Patent No. 406,273, dated July 2, 1889.

Application filed February 2, 1889. Serial No. 298,466. (No model.)

*To all whom it may concern:*

Be it known that I, PIERCE E. EVERETT, of Kansas City, Jackson county, Missouri, have invented certain new and useful Improvements in Self-Closing Faucets, of which the following is a full, clear, and exact description, reference being had to the accompanying drawings, forming a part hereof.

My invention relates to an improved self-closing faucet, whereby the water is cut off the moment the hand is released; and it consists in the novel construction and combination of parts, as will be more fully hereinafter described and claimed.

Referring to the drawings hereto annexed, and in which similar letters of reference indicate corresponding parts, Figure 1 is a vertical sectional view of my improved faucet. Fig. 2 is a horizontal section taken on the line $x$ $x$ of Fig. 1. Figs. 3 and 4 show details in perspective of the interior mechanism. Fig. 5 is a horizontal section taken on the line $y$ $y$ of Fig. 1. Fig. 6 is a detail view of a modification, and Fig. 7 is a detailed view illustrating the action of the modification shown in Fig. 6.

In constructing my improved faucet I employ a suitable body or casing A, to which is attached in the usual manner the discharge pipe or nozzle $a$, the feed-pipe $a'$, and the cap I. The body or casing of my faucet is cast with the usual water-chamber W, apertured valve-seat G, and partition $f''$, the apertures of which open directly into the water-chamber in the usual way.

Passing through the apertures of the valve-seat G and partition $f''$ is the valve-stem D, said valve-stem being provided with an annular shoulder or projection $h$, which fits into an enlarged portion or recess $h'$, made in the valve-seat G. Communicating with the recess $h'$ are the narrow inclined passages F F, which open into the water-chamber W, and through which the water is admitted the moment the valve is removed from its seat. The upper and lower ends of the valve-stem are considerably reduced, the end of the upper portion being threaded at $c$ and at suitable points upon the lower portion $b$, I cut the screw-threads $b'$ $b''$.

Upon the lower portion of the valve-stem is placed a solid rubber ball-valve E, the upper end of said ball-valve fitting into the concave bottom of the shoulder $h$ and its surface rests upon the valve-seat G, thus tightly closing the water-passage. The ball E is prevented from moving downward by the nut L, screwed upon the threaded portion $b''$, said nut being provided with an enlarged concaved bottom portion, as shown, which bears upon a hollow rubber ball K, held upon the stem portion $b$ between the concave faces of the nuts L L', as clearly shown in Fig. 1. The end of the stem portion $b$ passes through a partition or web N, formed in the feed-pipe $a'$, whereby a steady vertical movement of the valve-stem is insured.

In the portion of the body A above the water-chamber is formed a circular recess or compartment, in which rests a hollow rubber ball C, said rubber ball being placed upon the upper reduced portion of the valve-stem, and is provided with holes or perforations $d$, to allow the escape of the air held within said ball. The ball C is securely held in position by the circular concaved nut or threaded disk B, said nut engaging with the threaded end $c$, said end passing entirely through the same and entering a threaded bore $c'$ in the lower side of a cam $k'$.

The cap I is secured to the body A, as shown, and upon its interior surface are formed the inwardly-extending lugs H', adapted to work between the parallel lugs H H, formed in pairs integral with the cam $k'$, at diametrically-opposite points, and projecting laterally from the sides of said cam, forming guides for the cam, whereby all lateral movement of the same is prevented. The upper surface of the cam-block $k'$ is shaped as shown, or in any other suitable manner, and resting upon and engaging with said cam-surface is the obverse cam-surface of the upper cam-block $k$. The upper surface of the cam-block $k$ bears against the cap I, and cast integral with said cam-block is the stem or rod $l$, which passes through the cap-piece and carries the handle $p$ upon its upper end.

In Fig. 6 are shown views of a modification of the lower cam, said cam having a vertical ledge or collar 2, formed integral therewith, whereby a sort of bowl is formed, which retains the oil or other lubricant fed in through the aperture $r$, made in the top of cap-piece I. When oil is introduced through aperture $r$, it flows down over the outer surface of upper cam $k$, and is intercepted from further downward passage by the ledge or rim 2, and is thereby held in contact with the frictional surfaces of both cams, as shown in Fig. 7. If the rim 2 were not present, the oil would not be retained in the receptacle of the lower cam, but would run down and soon leave the frictional surfaces of both cams perfectly dry, in which condition they would, as is well known, be liable to cut and operate with difficulty.

Having described the details and construction of my device, I will now proceed to describe its operation.

The normal positions of the various parts are clearly shown in Fig. 1, and when it is desired to draw water from the same the handle $p$ is grasped and turned, thus turning the upper cam-block $k$. The cam-block $k$, meshing with the lower cam $k'$, (which is securely held by the lugs H H',) forces said cam down, thereby lowering the entire valve-stem, compressing the ball C, and unseating the ball-valve E. The water coming up through the apertures $m$ passes up the feed-pipe $a'$ into the recess $h'$ and out through the passages F into the water-chamber W, and down the discharge-pipe $a$. During this operation the air is forced out of the ball C, and the moment the hand is removed from the handle $p$ the air enters the ball C, fills the same, and in expanding raises the valve-stem and brings all the parts to their normal positions. The ball-valve E springs quickly to the seat G, and to prevent its hammering the same and to take up the water-hammer that occurs I employ an air-cushion K, which serves to steady and retard the motion of the ball, so that it returns to its seat in a quiet manner.

Heretofore it has been the practice to extend the pipe about a foot above the faucet, so as to form the well-known air chamber or cushion; but by my device this extension is avoided and the expense saved.

Another advantage of my device is the manner of constructing the cams, the usual method being to have the lower one turn and the upper one formed with the cap. This plan has been found to be very objectionable, as the parts are liable to get out of order; but in my improved faucet, where the cams are securely held in position, it is impossible for them to get out of order.

Having thus described my invention, what I claim and desire to secure by Letters Patent is—

1. In a faucet, the combination, with a body, of a valve-stem carried within said body, a valve secured upon the stem, and an air-cushion also secured upon the stem and adapted to prevent the hammering of the valve, substantially as shown and described.

2. In a faucet, the combination, with the body constructed as shown, of a valve-stem carried within said body, the valve E, secured upon its stem, the hollow rubber ball K, carried beneath the valve, the hollow elastic ball secured upon the upper portion of the valve-stem, the nut B, cams $k$ $k'$, and handle $p$, all arranged and adapted to operate substantially as shown and described.

3. The combination, with a cap provided with an oiling-aperture $r$, of the upper cam $k$, the rod $l$, handle $p$, and the lower cam $k'$, having the vertical oil-retaining ledge or rim 2, substantially as shown and described.

4. In a faucet, the combination, with a body A, provided with the usual cap, stand, and discharge-pipe and water-chamber, of the valve-seat G, having the enlarged recess $h'$, the passages F, communicating with the water-chamber and the recess $h'$, the valve-stem D, and valve E, all arranged and adapted to operate substantially as shown and described.

5. In a faucet, the combination, with a body constructed substantially as shown, of a valve-stem D, formed with an enlarged portion $h$, adapted to enter the enlarged recess $h'$, the ball-valve E, hollow rubber air-cushion K, carried below the valve-seat, the hollow expansible ball C, carried upon the upper portion of the valve-stem, the nut B, cams $k$ $k'$, and handle $p$, all connected substantially as shown and described.

In testimony whereof I affix my signature in presence of two witnesses.

PIERCE E. EVERETT.

Witnesses:
F. G. FISCHER,
A. A. HIGDON.